UNITED STATES PATENT OFFICE.

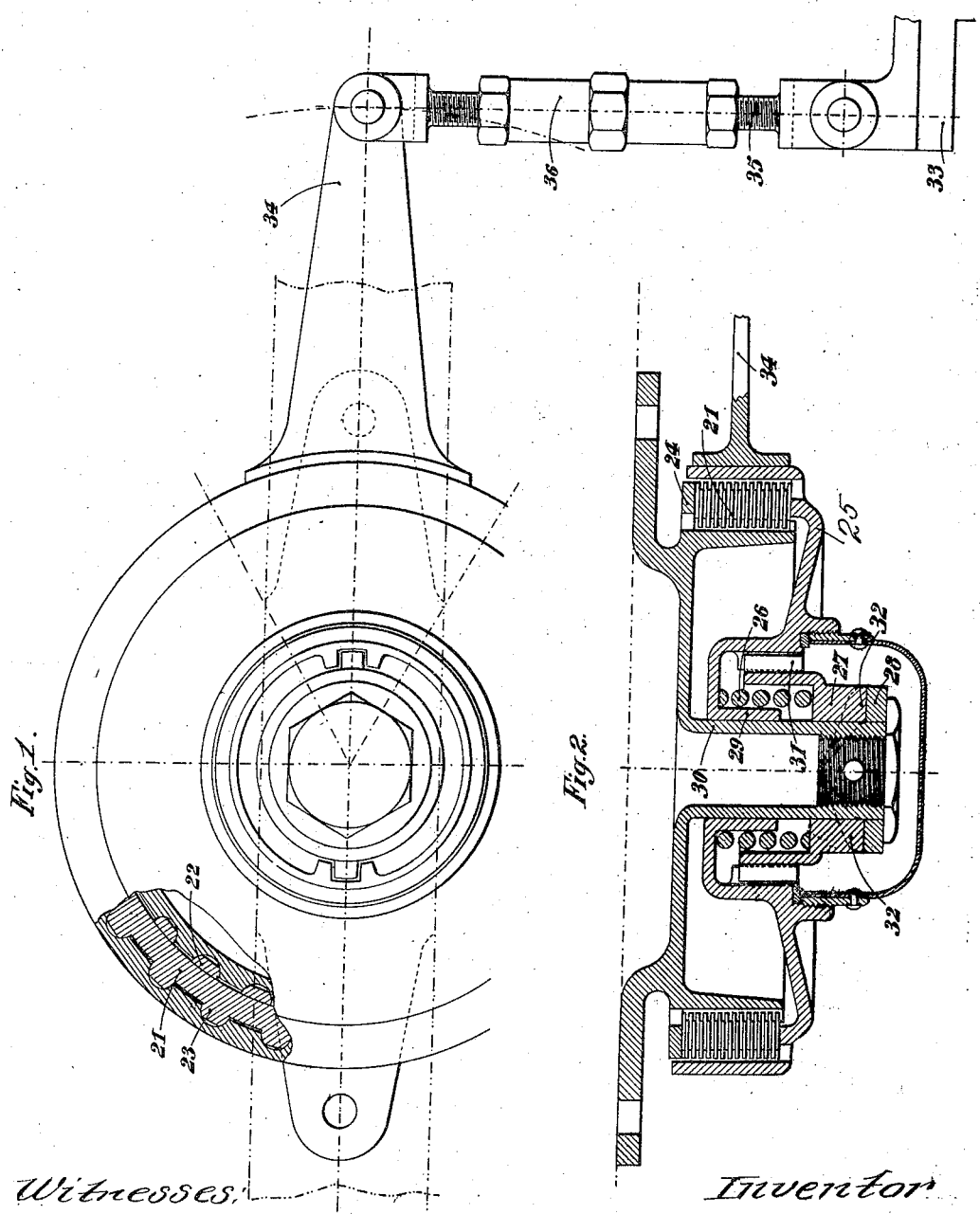

ARTHUR KREBS, OF PARIS, FRANCE, ASSIGNOR TO SOCIETE ANONYME DES ANCIENS ETABLISSEMENTS PANHARD ET LEVASSOR, OF PARIS, FRANCE.

SHOCK-ABSORBER.

No. 859,822.

Specification of Letters Patent.

Patented July 9, 1907.

Application filed October 9, 1905. Serial No. 282,070.

*To all whom it may concern:*

Be it known that I, ARTHUR KREBS, engineer, a citizen of the French Republic, residing at Paris, France, have invented certain new and useful Improvements in Shock-Absorbers, of which the following is a specification.

The object of this invention is an improved device for checking or deadening the vibrations imparted to suspended vehicles on passing over an obstacle.

When vehicles suspended on their axles by springs encounter some irregularity of level, the springs bend, and the box tends to make an oscillatory movement, which, theoretically, would not cease if the energy stored up in the spring at the moment of its leaving its position of equilibrium were not absorbed more or less rapidly owing to various causes, among others the friction of the spring plates against each other. It has been sought to check or deaden the vibrations by increasing this natural friction, and by creating special frictions to absorb the energy stored up by the spring at the time of its being forced out of shape. This is the principle of the friction suspension brakes, but in all the known appliances of this kind the friction retains a determined value resulting from the construction of the appliance; and, this friction, always the same, absorbs an unvarying quantity of energy. It is therefore readily understood that it only forms an imperfect solution of the problem. The energy stored up by the spring when bending out of shape is a function of the amount of irregularity of level. A constant friction deadener, therefore, is only suitable for a given change in the level. If there is a deviation from this in one direction or the other, the braking will be too energetic or else insufficient.

A shock absorbing device forming the subject of the present invention is characterized by a variable friction regulated by the flexion of the spring, and the energy of which corresponds for each change of level to the energy stored up by the spring; this flexion must be given rise in the device to a friction which will always be proportionate.

The accompanying drawings show by way of example shock absorbing devices in accordance with this invention for producing a variable friction proportional to the flexion of the spring.

Figure 1 and 2 are an elevation and a horizontal section of a shock absorber in accordance with this invention.

In a shock absorber in accordance with this invention friction is obtained between two cup shaped disks 24, 25, by means of the interposition of circular blades 21 superimposed on each other and alternately engaging with the disks 24 and 25, by means of bosses 22, 23. The disk 25 exercises pressure on the blades by means of a spring 26 which has its point of support on a nut 27 coming dead against a cam step 28 which is solid with the other disk 24. The disk 25 is guided by the socket 29 surrounding and bearing with a light friction against the central shaft 30 of the disk 24. The nut 27 also bears with a light friction on the shaft 30 and engages with the disk 25 by means of lugs 31 which enter corresponding grooves in the said disk. The surfaces of the nut 27 are formed of two helicoid curved faces 32 which are symmetrical and are in contact with the cam 28, so that on shifting the nut by rotation in one direction or the other from its normal position which corresponds to its complete insertion into the step, the latter thrusts the nut against the spring 26 which is thus compressed in proportion to the angular movement.

The operation of the appliance is then as follows:—
The disk 24 is fixed to the box while the other 25 is connected with the axle 33 by a lever 34 and a link 35. In the position of rest, under load, the link 35 the length of which is adjustable by means of a double nut 36 is regulated so as to place the nut in its normal position, *i. e.* completely inserted in the step. In this position the spring 26 is not compressed, the blades or plates 21 are not pressed against each other, and the disk 25 may begin to turn without experiencing resistance. As soon as the axle begins to move relatively to the box in one direction or the other it causes the rotation of the disk 25 by means of the link 35 and the lever 34; the nut 27 carried along in this movement by its lugs 31 glides along with the helicoidal faces 32 thereof against the cam 28 and proceeds to press the spring 26 which transmits its pressure to the plates 21 through the said disk 25. The plates or blades having the bosses 23 engaging the disk 25 glide along the plates or blades which engage with the other disk 24 by the bosses 22, under the growing pressure exercised by the spring 26. The friction strain therefore grows proportionately to the angular movement of the lever 34, that is to say, practically according to the movement of the axle relatively to its position at rest.

By suitably combining the number of plates or blades the flexibility of the spring 26 and the slope of the helicoidal surfaces of the nut and the step, the friction strains required in each case are obtained.

Having thus described and ascertained the nature of my invention and in what manner the same may be performed, I declare that what I claim is:

1. A progressive shock absorber for vehicles comprising a pair of disks, one of which is connected to the body of the vehicle and the other of which is connected to the axle, a series of superimposed blades interposed between the disks and alternately engaging the disk connected to the body and the disk connected to the axle, a compressible spring engaging one of the disks and adapted, when compressed, to move one disk towards the other, thereby shifting the blades to create friction, a cam step carried by one of the disks, and means riding upon the step for compressing the spring.

2. A progressive shock absorber for vehicles comprising a pair of cup-shaped disks, one of which extends into the other, and each of which is provided with grooves the grooves of one opposing the grooves of the other disk, a series of superimposed blades interposed between the disks and provided with bosses, the bosses of said blades alternately engaging in the grooves of the disks, a compressible spring engaging one of the disks and adapted, when compressed, to move one disk towards the other, thereby shifting the blades to create friction, a cam step carried by one of the disks, and means riding upon the cam step for compressing the spring.

In testimony whereof I have hereunto set my hand in presence of two subscribing witnesses.

ARTHUR KREBS.

Witnesses:
PIERRE LEISSE,
MAX. DE RIVAUD.